United States Patent
Zimmer

(10) Patent No.: US 8,068,146 B2
(45) Date of Patent: Nov. 29, 2011

(54) OPPONENT COLOR DETAIL ENHANCEMENT FOR SATURATED COLORS

(75) Inventor: Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 12/347,272

(22) Filed: Dec. 31, 2008

(65) Prior Publication Data

US 2010/0165149 A1 Jul. 1, 2010

(51) Int. Cl.
*H04N 5/228* (2006.01)
(52) U.S. Cl. ........................ 348/222.1; 382/167; 358/518
(58) Field of Classification Search ........................ None
See application file for complete search history.

(56) References Cited

U.S. PATENT DOCUMENTS

2008/0231921 A1* 9/2008 Dokuni ........................ 358/520

* cited by examiner

*Primary Examiner* — Lin Ye
*Assistant Examiner* — Dennis Hogue
(74) *Attorney, Agent, or Firm* — Wong, Cabello, Lutsch, Rutherford & Brucculeri, LLP

(57) ABSTRACT

A method, system and device for enhancing detail in areas of saturated color in an image are described. As areas of saturated color are detected in an image the opponent color channel is used to calculate a factor to apply to the original pixel value. By calculating this factor to adjust the pixel values of the image detail may be enhanced in the color saturated areas. A user supplied value may also be included to control the amount of automatic adjustment to the pixel values.

17 Claims, 5 Drawing Sheets

OPPONENT COLOR DETAIL ENHANCEMENT FOR SATURATED COLORS

BACKGROUND

The digital image sensor, such as a charged coupled device (CCD), of a digital camera has a plurality of photo-sites arranged in a colored filtered array or pattern, such as a RGB Bayer pattern described in U.S. Pat. No. 3,971,065. In the RGB Bayer pattern, each photo-site is filtered so that it is receptive to either red, green, or blue or some variation thereof. The original bit-for-bit digital image file captured by the digital imaging sensor is referred to as a RAW file or RAW image. Depending on a number of variables, the RAW image may typically require 8 to 18 MB of memory space. The type of colored filter array and digital imaging sensor varies typically based on the manufacture of the digital camera. For example, some color filtered arrays use a pattern of yellow, cyan, green, and magenta.

Typically, the digital camera has an image pipeline that performs a demosaicing or de-Bayering process on the RAW image and transforms the image with a compressing algorithm to output a JPEG or other type of compressed file suitable for display and viewing. However, the RAW image captured by the digital camera can be uploaded to a computer where computer software, such as Apple's Aperture 1.0, can allow a user to perform various manual operations on RAW image.

The color information of processed digital images can be characterized by a number of color models. One color model is the RGB color space, which uses combinations of red (R), green (G), and blue (B) to produce a plurality of colors. Some RGB color spaces used for digital cameras include Standard RGB (sRGB) and Adobe RGB. Another color model is the CIE XYZ color space created by the International Commission on Illumination (CIE) in 1931. Mathematical techniques can be used to transform color information from one color space to another.

Digital cameras have white balance settings, such as auto, incandescent, fluorescent, cloudy, sunny, or sensitivity (e.g., ISO 100, ISO 2000, etc). The settings are used to match the white balance of the digital camera to the color temperature of light from the illuminant that is illuminating the subject in the image. Characteristics of various standard illuminants are defined in the art. For example, illuminant A is used to represent incandescent lighting and is defined by the profile of a black body radiator at 2856 K. Illuminant series D is used to represent natural daylight. A number is used in the name of the D series illuminant to indicate the correlated color temperature (CCT) of the source. For example, illuminant D50 has a CCT of 5000 K, and illuminant D65 has one of 6500 K. Illuminant series F is used to represent various types of fluorescent lighting. For example, illuminant F2 represents cool white fluorescent, while illuminant F11 represents a narrowband fluorescent. When a digital image is obtained under one illuminant with a digital camera, it is possible to use a white point conversion technique to estimate the characteristics of the image under a different illuminant.

Various considerations must be addressed when processing a digital image obtained with a digital camera or other imaging device. One consideration involves preserving the spatial quality and the detail of the digital image, while another consideration involves sufficiently representing the color of the digital image. In many ways, these two considerations are interrelated. In areas of high color saturation, there may be too little perceivable detail because these areas affect the camera sensors. Even if the area of highly saturated color has texture the detail may not be as sharp as desired. What is needed is a method to increase the detail in these areas of saturated color.

BRIEF DESCRIPTION OF THE DRAWINGS

Preferred embodiments and other aspects of subject matter of the present disclosure will be best understood with reference to a detailed description of specific embodiments, which follows, when read in conjunction with the accompanying drawings, in which.

DETAILED DESCRIPTION

This disclosure pertains to a method of increasing the perceivable detail in areas of high color saturation when processing RAW images. A description of processing RAW images into an absolute color space and other image processing techniques are described in U.S. patent application Ser. No. 11/549,627 entitled "System and Method for Raw Image Processing Using Conversion Matrix Interpolated From Predetermined Camera Characterization Matrices" by Gabriel Marcu et al., filed 13 Oct. 2006 which is hereby incorporated by reference in its entirety.

While this disclosure discusses a new technique for processing RAW images, one of ordinary skill in the art would recognize that the techniques disclosed may also be applied to other forms of images as well.

When capturing digital images with a camera, the camera's sensors may detect information about the image that is not perceivable when viewing a subsequently processed RAW image. This is at least in part because there is too little perceivable detail in areas of highly saturated color. Even if the highly saturated color has texture, the detail is not as sharp as may be desired. Sharpening is the typical method for increasing perceived detail. Typical sharpening applies to the luminance channel only. The actual detail in saturated areas of color may not have much luminance variation, and thus sharpening may not produce much effect in areas exhibiting saturated color.

To increase the perceived detail of the saturated color area, the "opponent" channels of the saturated color are used. Opponent channels are the color components that are not the dominant color component. In the RGB color space, for example, when the saturated color is Red the opponent channels are Green and Blue. When the saturated color is Blue the opponent channels are Red and Green. When the saturated color is Green the opponent channels are Red and Blue. In the human visual system, the Green channel carries the most information, Red carries significantly less visual information, and Blur carries by far the least visual information. For this reason, we choose to let Green be the single opponent channel to Red. Contrast between colors is also an issue. Because the Red channel provides the most contrast from the Blue channel, Red is chosen to be the opponent color channel to Blue. Finally, because of the way that Green is perceived by both sensors and the human eye, the opponent color used for areas of saturated Green is simply Green. This implies that Green channel detail cannot be measurably increased by including information from the lower-information Red and Blue channels.

Figure 1:
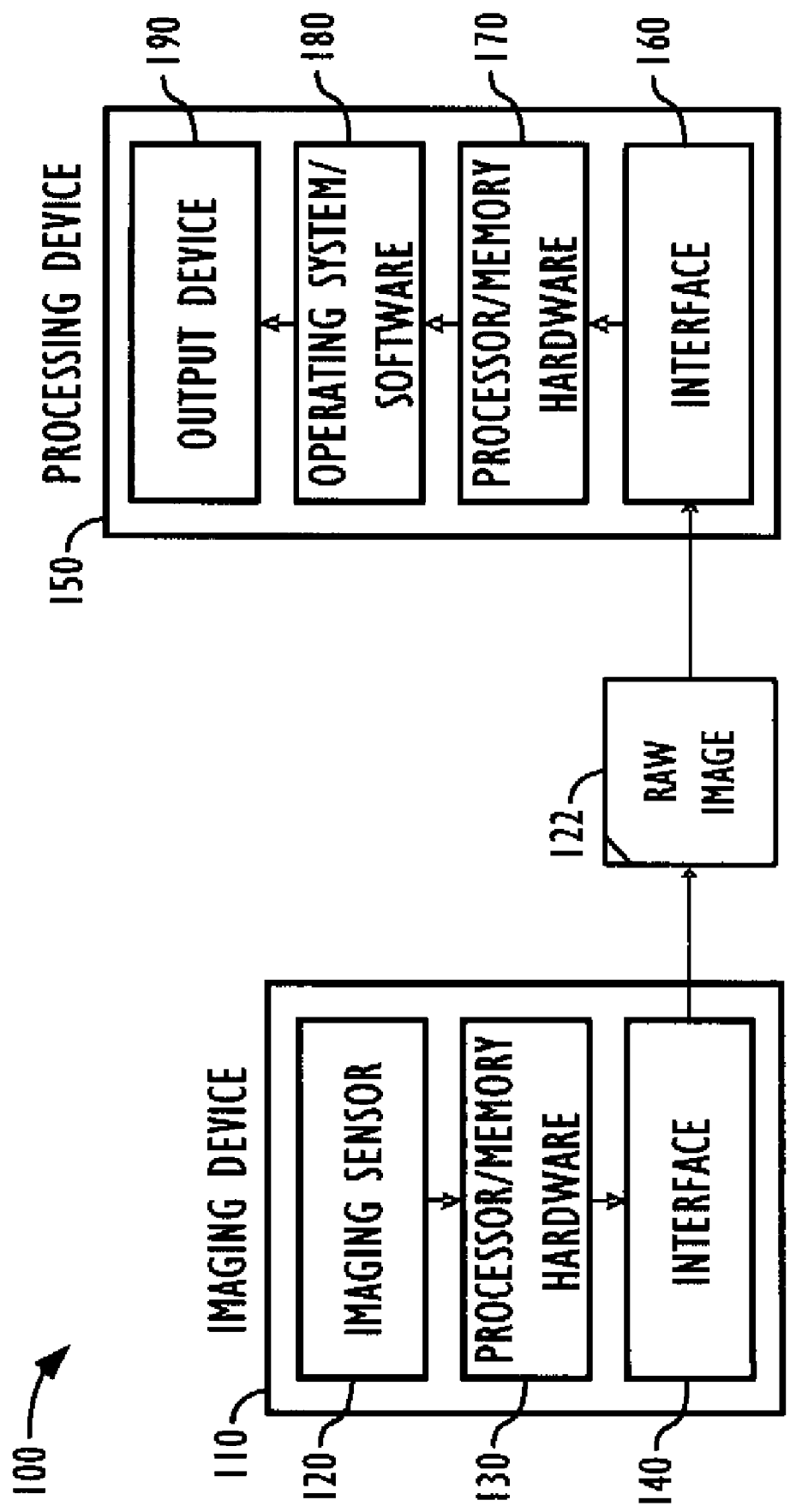
FIG. 1 illustrates one embodiment of a system for generating and processing RAW images.

Referring to FIG. 1, one embodiment of a system 100 for generating and processing RAW images is schematically illustrated. The system 100 includes an imaging device 110 and a general-purpose processing device 150. In general, the imaging device 110 and the general-purpose processing device 150 may be integrated together into one device, such as a digital still camera or the like, that has requisite processing and memory capabilities. Alternatively, the devices 110 and 150 may be separate components as shown in FIG. 1. For example, the imaging device 110 can be a digital still camera, a camera phone, or the like, and the processing device 150 can be a desktop computer, laptop computer, or the like. In the description that follows, the imaging device 110 is referred to as a camera, and the processing device 150 is referred to as a general purpose computer for illustrative purposes.

The camera 110 includes an imaging sensor 120 for capturing digital images. The imaging sensor 120 can be any of the various types of imaging sensors known and used in the art, such as a charged coupled device. The camera 110 also has processor and memory hardware 130 and an interface 140 for communicating data to the computer 150. In turn, the computer 150 has an interface 160, processor and memory hardware 170, operating system and software 180, and an output device 190.

In use, the imaging sensor 120 of the camera 110 captures a RAW image 122. As discussed previously, the imaging sensor 120 has a color-filtered array that can be arranged, for example, in an RGB Bayer pattern. Therefore, the color value at each photo-site in the RAW image 122 represents either a red intensity value, a green intensity value, or a blue intensity value, and each value is typically 12-bits in the range of 0 to 4096. Other camera manufactures may have other color filter arrays so that the RAW image 122 may have different information. For a Sony "828" digital camera, for example, the color values are in four-channel RGBE coordinates representing Red, Green, Blue, and Emerald. For descriptive purposes, the discussion that follows will refer to the RAW image 122 having RGB values.

After capturing the RAW image, the processor/memory hardware 130 can output the RAW image 122 via the interface 140, which can be a Universal Serial Bus (USB) interface. The computer 150 can then receive the RAW image 122 through its interface 160. Preferably, the computer 150 stores the RAW image 122 as a master file to maintain an original copy of the RAW image 122 while pre-processing, described below, is performed on a copy of the RAW image 122. In an alternative to importing the RAW image 122 from the camera 110, RAW image 122 can be imported from a network, a memory card, another computer, or an external storage media such as a flash memory, external hard disk drive, or CDROM.

Using techniques discussed in detail later, the processor/memory hardware 170 and operating system/software 180 pre-process the copy of the RAW image 122 and ultimately convert it into an absolute color space (e.g., sRGB, Adobe RGB, or the like, which is also referred to as a rendered color space) suitable for display and viewing. After pre-processing the RAW image 122 and converting it to an absolute color space, the processor/memory hardware 170 and operating system/software 180 make the resulting image available to various types of software and applications on the computer 150. For example, the resulting pre-processed image may be made available to imaging applications, such as Apple's Preview, iPhoto,® and Aperture software applications, where the image can be processed, viewed, manipulated, etc. (IPHOTO is a registered trademark of Apple Inc., of Cupertino, Calif.)

Figure 2:
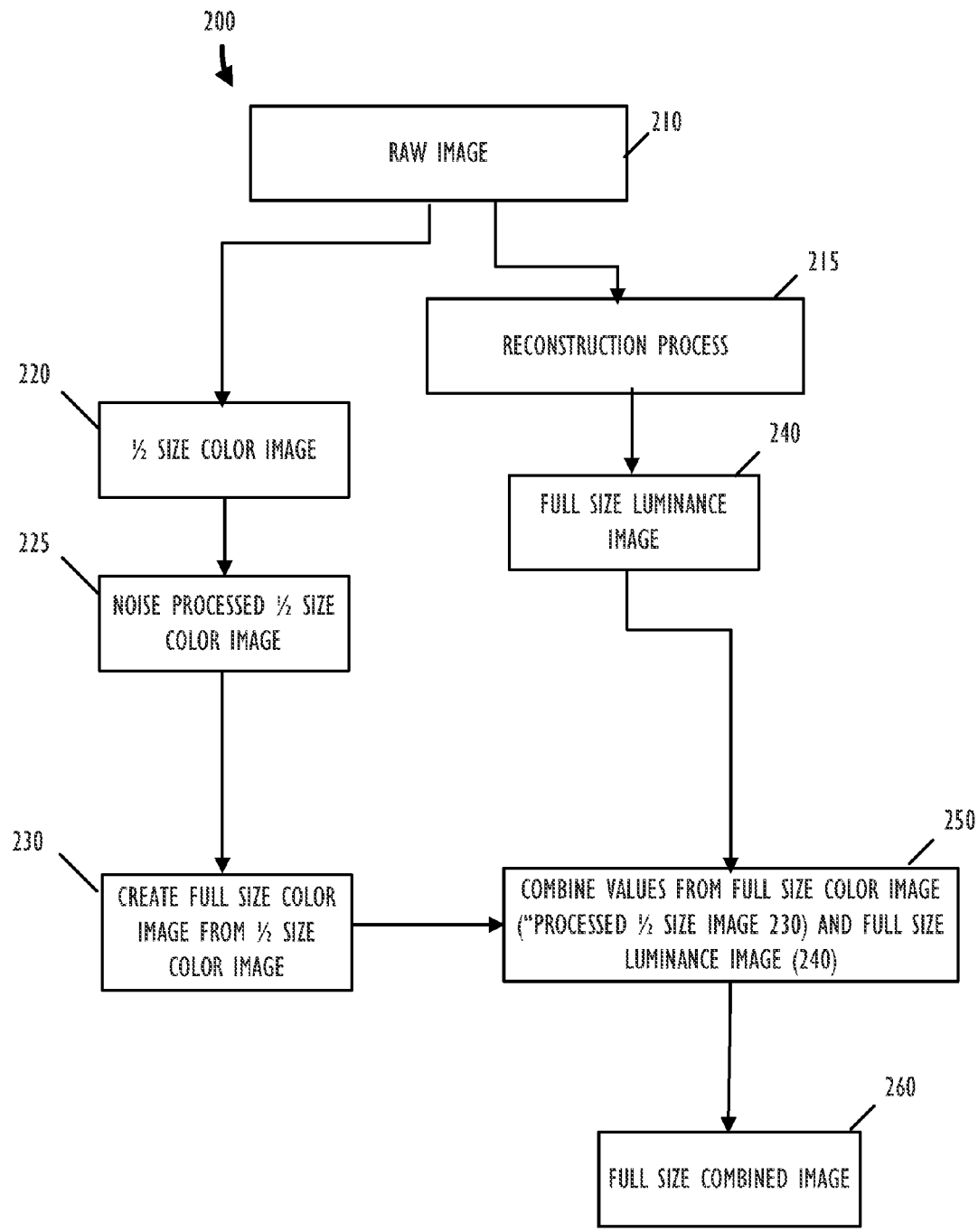
FIG. 2 illustrates, in flow chart form, a process flow overview for one embodiment of the invention.

Referring now to FIG. 2, a flowchart illustrates one embodiment of the invention via process 200. Process 200 shows an example embodiment which combines a processed ½ size color image and a full size luminance image to increase the perceivable detail in areas of saturated color. Starting from block 210 with a RAW image, two reconstruction processes are performed. First, at block 215, a full size image is reconstructed into Red Green Blue (RGB) values and then put together at block 240. As is known in the art, the Bayer pattern (RGGB) does not allow for every color to be available at every pixel. There are several known techniques for converting a Bayer pattern into an image but are not pertinent to this invention. Second, at block 220 a ½ size image is extracted from the raw image and processed using chroma blur and other techniques. As part of this operation, chroma noise is removed from the ½ size image to produce a noise processed ½ size color image at block 225. This is done, in one embodiment, by lookup from a table that has been generated once per camera. The table contains a combination of noise levels which are determined based on a function of ISO versus exposure time. From this information, the noise at any spot in the image can be determined. From the ½ size image a full size color image is generated at block 230.

Thus, at block 230 we have a ½-size processed image (interpolated to full size) that has, inter alia, good quality chrominance values and, at block 240, a full size luminance image from a reconstructed RGB image that has, inter alia, good quality luminance values. Next, at block 250 we combine these now two full sized images to produce a full size combined image at block 260. One example method of determining values to aid in this combination process (i.e., block 250) is explained more fully below via processes 300, 400 and 500.

Figure 3:
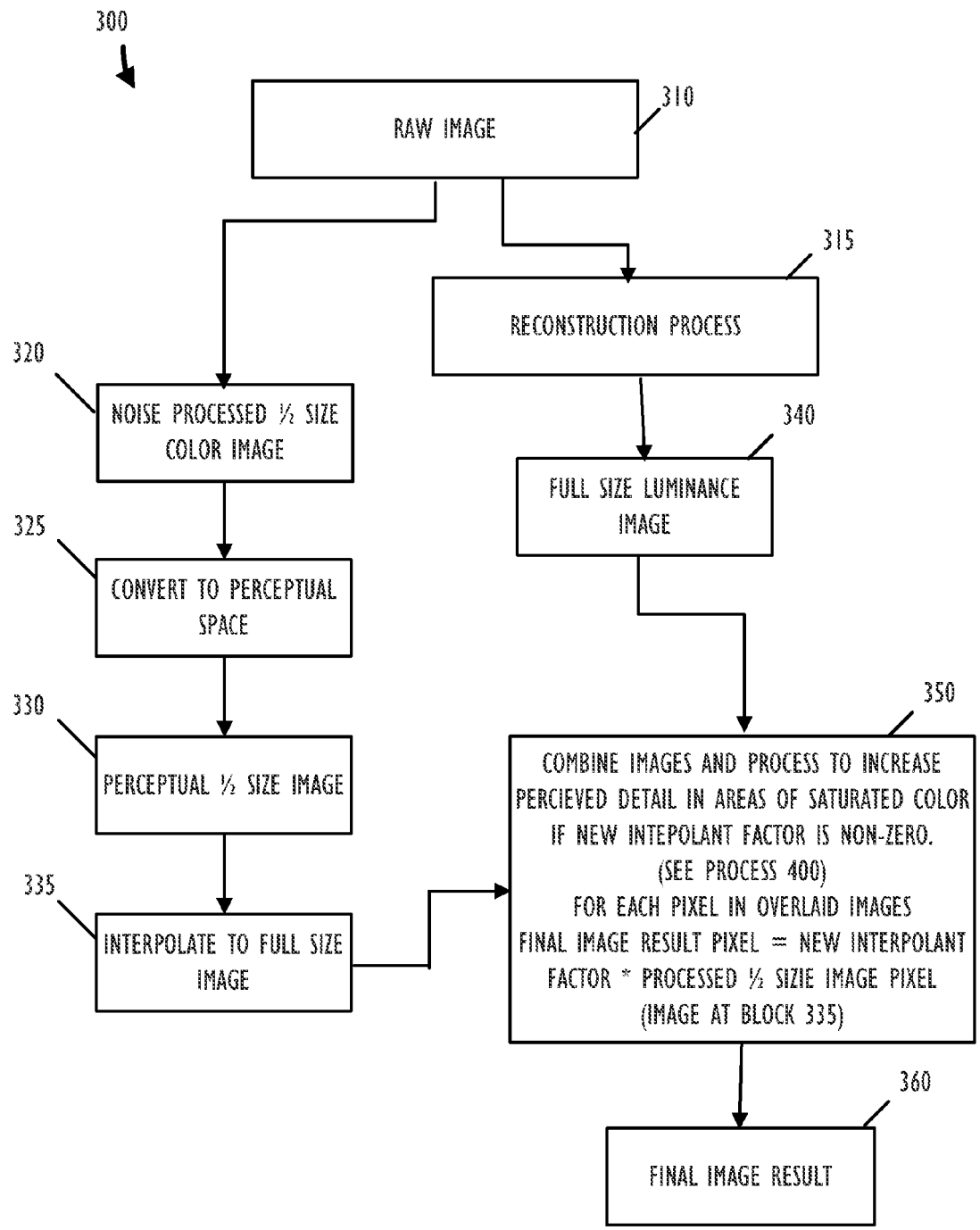
FIG. 3 illustrates, in flowchart form, one embodiment of a process for combining the opponent color factor and other determined factors to increase detail in areas of saturated color.

Referring now to FIG. 3, another embodiment of the invention is illustrated via process 300. In a similar manner to process 200, described above, process 300 begins with a RAW image at block 310 and a reconstruction process (See 215) is performed at block 315. Also, the noise processed ½-size color image 320 has had chroma noise removed by some form of chroma blur operation at this point (See 225). The results of the reconstruction process and the noise processing are two images represented at blocks 320 and 340. The image at block 320 is a noise processed ½-size color image that is now converted to perceptual space at block 325. In one embodiment, the noise processed ½-size image is converted to perceptual space by taking the square root of each component color value, usually via table lookup at block 325, resulting in a perceptual ½-size image (block 330). The perceptual ½-size image is then interpolated to full size (block 335) by some form of interpolation (e.g., linear, nearest-neighbor, cubic convolution and B-splines). The now full size processed image of block 335 can be combined with the reconstructed full size image of block 340 (i.e., overlaid so that corresponding pixels will be used for further processing). At block 350, a final image result 360 is produced by combining individual pixel values to increase the perceivable detail in areas of saturated color using a determined interpolant factor based on opponent color values in these areas of saturation (described below in processes 400 and 500). Block 350 shows that for each pixel in the overlaid images the new interpolant factor is multiplied by the corresponding value of the pixel in the interpolated ½ size processed image (i.e., image at block 335) to produce the final pixel. Note however, that this new interpolant factor is only used in areas of saturated color and may not necessarily be applicable to all pixels. Furthermore, there may be an optional user control variable to control the amount of opponent color processing applied to each pixel value based on this embodiment of the invention.

Figure 4:
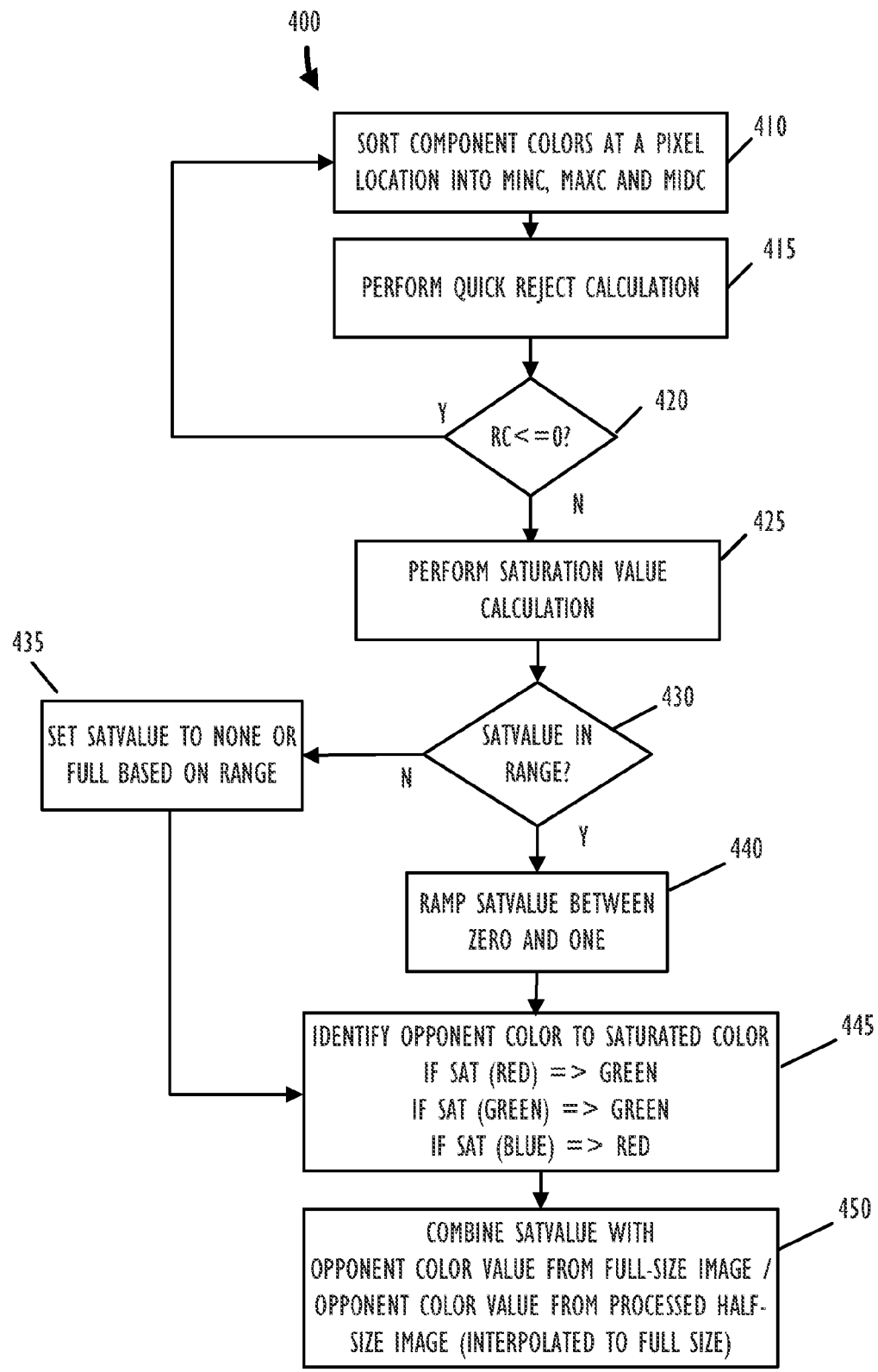
FIG. 4 illustrates, in flowchart form, one embodiment of a process for determining a factor to increase detail using the opponent color.

Referring now to FIG. 4, a flowchart illustrates a process 400 to determine areas of saturated color which could be beneficially processed by a technique in accordance with embodiments of the invention. The values of each color component are used to identify areas of saturated color as follows: for each pixel value in the perceptual ½-size image (block 330 of FIG. 3), each color component value is sorted into a Minimal component (MINC) a Middle component (MIDC) and a Maximum component (MAXC) at block 410. Note that saturation varies in value from 0 to 1 and is determined by the equation (MAXC−MINC)/MAXC. Other methods are available in the art for computing saturation, and they can be used here as well.

In one embodiment of the invention, opponent color processing is only scaled in application for saturation values between ⅓ and ½. That is, when the saturated value is below ⅓, no opponent color processing is performed (i.e., 0); when the saturated value is above ½ full, opponent color processing is performed (i.e., 1); and when the saturated value is between ⅓ and ½, the amount of opponent color processing effect is ramped in by a scale factor which can range from 0 to 1. One of ordinary skill in the art will recognize that the limits ⅓ and ½ are illustrative only. Other ranges may be used to accommodate different types of sensors or the like.

Thus, a quick reject of opponent color processing for a pixel may be determined as illustrated in block 415 via the calculation [(MAXC−MINC)×3]−MAXC≦0 (which means that saturation is ≦⅓). At block 420, it is determined if the reject calculation (RC) is less than or equal to zero. If so (the YES prong of block 420), processing returns to block 410 for the next pixel. If not (the NO prong of block 420), processing continues to block 425 to determine the amount of saturation at this pixel (i.e., (MAXC−MINC)/MAXC). If the saturation value is within a particular range such as ⅓ to ½ (the YES prong of block 430), processing continues to block 440 where the amount of opponent color processing is ramped between the values of 0 (none) and full (1). Alternatively, if the saturation is out of this range (the NO prong of block 430), then at block 435 the amount of opponent color processing is set to the appropriate value of 0 or 1. Next, at block 445 the opponent color is identified and processing continues to block 450 where the amount of opponent color processing (determined from the saturation value) is used to interpolate the numerators and denominators used in computing the scaling factor applied to the processed ½ size color (e.g., 230 or 335) to produce the final color. Thus, the opponent color is used to increase the perceived detail at a pixel identified as having a saturated color value, where after processing returns to block 410 for the next pixel location in the image. To illustrate one particular example, if Red is the saturated component then Green will be used as the opponent color to create this single interpolant factor which has the result of increasing the perceived detail in Red. In like manner, if Green or Blue is the saturated component then Green will be used as the opponent color.

Figure 5:
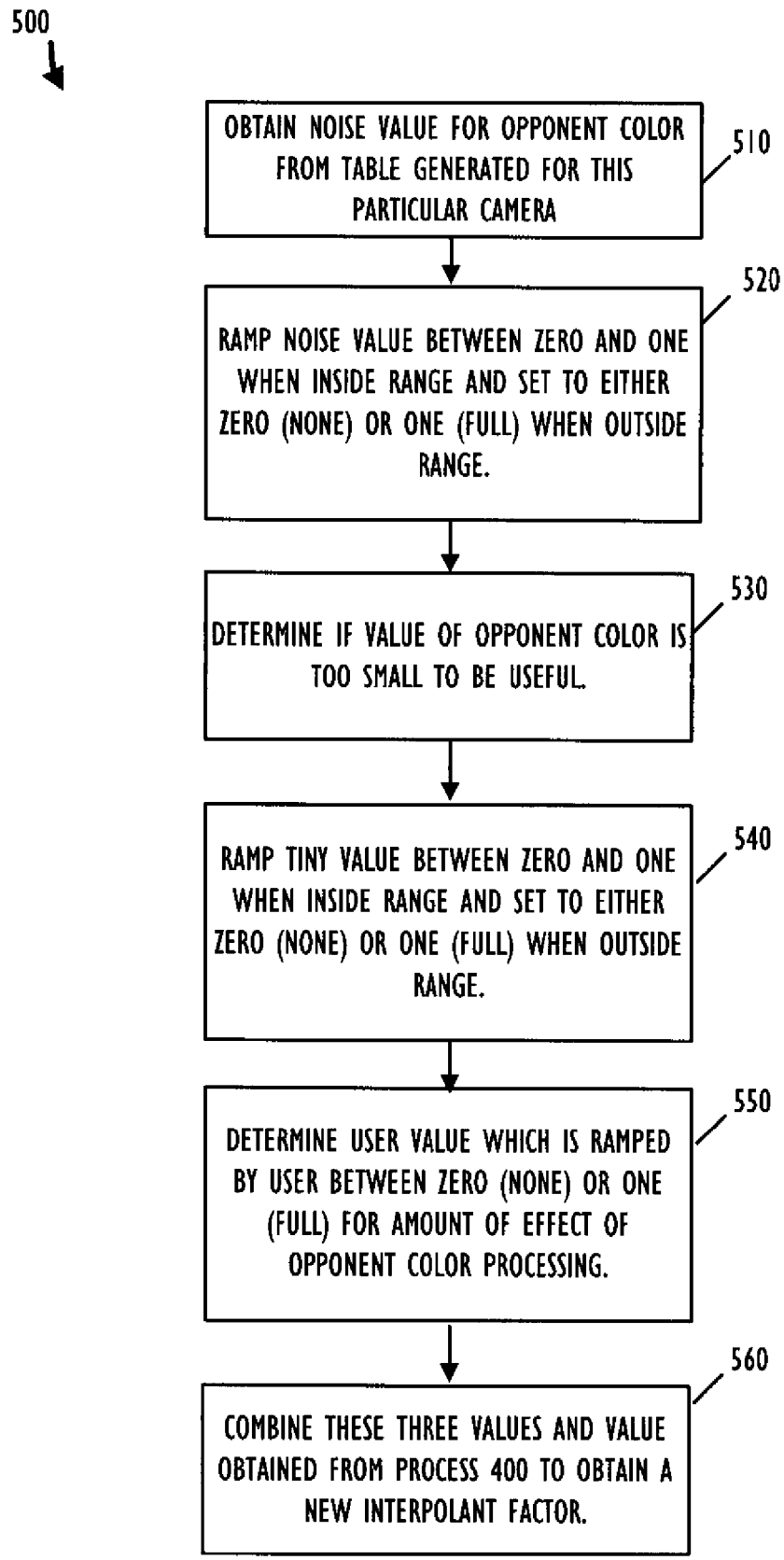
FIG. 5 illustrates, in flowchart form, one embodiment of a process for determining other example factors to combine with opponent color factor to increase detail in areas of saturated color.

Referring now to FIG. 5, examples of other possible factors used to control one embodiment of opponent color processing are illustrated. At block 510, the noise value for the opponent color measurement is obtained from a table for the particular camera that captured this RAW image. At block 520, the noise value is used to ramp a second factor between zero and one to again control the amount of opponent color processing for this particular pixel. For example, the noise value is used to prevent highly noisy opponent color values from having an adverse effect on the final image by introducing too much noise grain. If the noise value (typically signal-to-noise ratio) is above a certain threshold then the opponent color processing is set to none (i.e., 0). If the noise value (typically the signal-to-noise ratio) is below a certain threshold then the opponent color processing is set to full (i.e., 1). For values between these two thresholds the amount of opponent color processing is ramped between the values of zero and one as appropriate (e.g., linearly).

At block 530, the "tiny values" factor is determined and used to ramp the interpolant factor to 0 when the opponent signal is very small. For example, at values above 256 the tiny values factor is used to set the opponent color processing to full (i.e., 1); it ramps to 0 for opponent signal values in the range 256 to 128 and is 0 for values below 128. Thus, when the value of the opponent signal does not carry enough useful information the opponent color processing does not affect the resultant image. Failure to prevent the tiny opponent color signal value from being used as scale factors for the ½ size image values will cause excessive leveling (quantization) to be apparent in the final result image.

At block 550 a "user value" is determined, typically via user input, to allow the user to control the amount of opponent color processing in effect for image processing. This value is again ramped from full (i.e., 1) to none (i.e., 0). Finally, each of these 3 values (opponent color noise, tiny values and user input) are combined at block 560 to obtain a new interpolant factor for use in opponent color processing as described for process 400. One example method of combining these values is to simply multiply these factors to obtain a final interpolant factor for use in opponent color processing. Obviously, when the interpolant factor obtained is zero, opponent color processing is disabled and for each pixel where this is the case standard image processing techniques are used. Also note, this technique is only applied to areas determined to be color saturated and other non-saturated areas of the image are left alone by this technique.

Thus, a quick reject of opponent color processing for a pixel may be determined as illustrated in block 415 via the calculation [(MAXC−MINC)×3]−MAXC≦0 (which means that saturation is ≦⅓). At block 420, it is determined if the reject calculation (RC) is less than or equal to zero. If so (the YES prong of block 420), processing returns to block 410 for the next pixel. If not (the NO prong of block 420), processing continues to block 425 to determine the amount of saturation at this pixel (i.e., (MAXC−MINC)/MAXC). If the saturation value is within a particular range such as ⅓ to ½ (the YES prong of block 430), processing continues to block 440 where the amount of opponent color processing is ramped between the values of 0 (none) and full (1). Alternatively, if the saturation is out of this range (the NO prong of block 430), then at block 435 the amount of opponent color processing is set to the appropriate value of 0 or 1. Next, at block 445 the opponent color is identified and processing continues to block 450 where the amount of opponent color processing (determined from the saturation value) is used to interpolate the numerators and denominators used in computing the scaling factor applied to the processed ½ size color (e.g., 230 or 335) to produce the final color. Thus, the opponent color is used to increase the perceived detail at a pixel identified as having a saturated color value, where after processing returns to block 410 for the next pixel location in the image. To illustrate one particular example, if Red is the saturated component then Green will be used as the opponent color to create this single interpolant factor which has the result of increasing the perceived detail in Red. In like manner, if Green or Blue is the saturated component then Green will be used as the opponent color.

In a system with no opponent detail increase, one example method to evaluate the final color is by scaling the chroma-noise-free processed half-size image pixel in the following way:

```
if (phs_lum == 0)
    factor = 0;
else
    factor = lum / phs_lum;
    final_red = phs_red * factor;
    final_green = phs_green * factor;
final_blue = phs_blue * factor;
```

In an opponent-color system, we can calculate the opponent lum (dlum) and opponent phs_lum (dphs_lum) values differently (for example):

```
if (maximal component is Red)
{
    dlum = green;
    dphs_lum = phs_green;
}
else if (maximal component is Blue)
{
    dlum = red;
    dphs_lum = phs_red;
}
else if (maximal component is Green)
{
    dlum = green;
    dphs_lum = phs_green;
}
```

These values may then be used to compute the scaling factor as in the standard case: factor=dlum/dphs_lum;

But the opponent color method of calculating "luminances" for scaling is dangerous and may result in image artifacts. Thus we use three soft decisions (that work out to be interpolation factors) to mitigate the application of the opponent color:

1) saturation (e.g., FIG. 4 SATVALUE)

opponent color detail increase is only applied in areas of significant saturation 2) noise (e.g., FIG. 5, 510-520)

opponent color detail increase is only applied in areas where the opponent color channel has a high signal-to-noise ratio (to avoid excessive noise grain in the new detail)

3) tiny values (e.g., FIG. 5, 530-540)

opponent color detail increase is only applied in areas where the opponent color channel has a large enough value to prevent excessive leveling in the final image result.

In this example embodiment, the three interpolation factors are multiplied together to form a single interpolant. This interpolant has a polarity such that a value of 1.0 means use full opponent color detail increase and a value of 0.0 means use the standard approach to computing the scaling factor. We use the interpolant as illustrated in the following pseudocode to calculate the scaling factor (See, e.g., block 560 in FIG. 5):

```
lum=interpolant*dlum+(1−interpolant)*lum;

phs_lum=interpolant*dphs_lum+(1−interpolant)*
    phs_lum;

factor=lum/phs_lum;
``` and then the final color may be calculated as follows:

```
If (phs_lum == 0)
    factor = 0;
else
    factor = lum / phs_lum;
    final_red = phs_red * factor;
    final_green = phs_green * factor;
final_blue = phs_blue * factor;
```

The description above is presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

Various changes in the details of the illustrated operational methods are possible without departing from the scope of the following claims. For instance, illustrative image processing processes 200, 300, 400 and 500 may perform the identified steps in an order different form that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 1-5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes referred to as computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A method of performing image processing on a device having one or more processing devices, the method comprising:

receiving a first color image having a plurality of locations;

generating, using one or more processing devices, a second color image based on the first color image, the second color image having a plurality of locations, each location in the second color image having a corresponding location in the first color image;

generating, using the one or more processing devices, a luminance image based on the first color image, the luminance image having a plurality of locations, each location corresponding to a location in the first color image;

determining, using the one or more processing devices, a saturated color in the first color image at a first location;

identifying an opponent color of the saturated color wherein the opponent color is selected from the group of: green as the opponent color of green, green as the opponent color of red, and red as the opponent color of blue;

determining an interpolant to increase perceivable detail at the first location; and generating, using the one or more processing devices, a result image using the interpolant to combine the second color image and the luminance image at a location in the result image corresponding to the first location.

2. The method of claim 1 further comprising performing noise reduction on the first color image.

3. The method of claim 2, wherein noise reduction is performed on a half-sized color image generated from the first color image.

4. The method of claim 1 further comprising:
sorting component colors at a pixel location into minimum, maximum and middle; and
performing a quick reject calculation for areas of low saturation.

5. The method of claim 1 further comprising preventing a tiny opponent color signal value from being used as a scale factor.

6. The method of claim 1 further comprising utilizing a user supplied value, the user supplied value indicating an amount of opponent color processing and used to affect a scale factor for the interpolant.

7. The method of claim 1 further comprising preventing a noisy opponent color signal value from being used as a scale factor.

8. The method of claim 1 further comprising ramping a saturation value between zero and one to be used as a scale factor for the interpolant.

9. An apparatus for processing a digital image comprising one or more processing devices wherein the one or more processing devices are programmed to:
receive a first color image having a plurality of locations;
generate a second color image based on the first color image, the second color image having a plurality of locations, each location in the second color image having a corresponding location in the first color image;

generate a luminance image based on the first color image, the luminance image having a plurality of locations, each location corresponding to a location in the first color image;

determine a saturated color in the first color image at a first location;

identify an opponent color of the saturated color wherein the opponent color is selected from the group consisting of: green as the opponent color of green, green as the opponent color of red, and red as the opponent color of blue;

determine an interpolant to increase perceivable detail at the first location; and generate a result image using the interpolant to combine the second color image and the luminance image at a location in the result image corresponding to the first location.

10. The apparatus of claim 9 wherein the programmed act of determining an interpolant is scaled via a user defined value.

11. The apparatus of claim 9 wherein the one or more processing devices are further programmed to perform noise reduction on a digital image.

12. The apparatus of claim 9 wherein the apparatus comprises a computer.

13. The apparatus of claim 9 wherein the apparatus comprises a digital camera.

14. The apparatus of claim 9 wherein the one or more programmable processing devices are further programmed to:
sort component colors at a pixel location into minimum, maximum and middle; and
perform a quick reject calculation for areas of low saturation.

15. The apparatus of claim 9 wherein the one or more programmable processing devices are further programmed to prevent a tiny opponent color signal value from being used as a scale factor for half size image values.

16. The apparatus of claim 9 wherein the programmed act of determining an interpolant is scaled via a ramping value based on a saturation value.

17. A non-transitory computer readable medium with instructions stored thereon for causing one or more programmable control devices to perform the method of claim 1.

* * * * *